United States Patent [19]
Gupta

[11] Patent Number: 5,987,408
[45] Date of Patent: *Nov. 16, 1999

[54] AUTOMATED DIRECTORY ASSISTANCE SYSTEM UTILIZING A HEURISTICS MODEL FOR PREDICTING THE MOST LIKELY REQUESTED NUMBER

[75] Inventor: Vishwa Gupta, Brossard, Canada

[73] Assignee: Nortel Networks Corporation, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/767,503

[22] Filed: Dec. 16, 1996

[51] Int. Cl.$^6$ .............................. G10L 5/06; G10L 9/00; G10L 3/00
[52] U.S. Cl. ........................................ 704/231; 704/275
[58] Field of Search ...................... 704/231, 275

[56] References Cited

U.S. PATENT DOCUMENTS

| | | | |
|---|---|---|---|
| 4,164,025 | 8/1979 | Dubnowski et al. | 364/900 |
| 4,751,736 | 6/1988 | Gupta et al. | 381/31 |
| 4,751,737 | 6/1988 | Gerson et al. | 381/43 |
| 4,797,910 | 1/1989 | Daudelin | 379/67 |
| 4,956,865 | 9/1990 | Lennig et al. | 381/43 |
| 4,959,855 | 9/1990 | Daudelin | 379/213 |
| 4,979,206 | 12/1990 | Padden et al. | 379/67 |
| 5,050,215 | 9/1991 | Nishimura | 381/41 |
| 5,052,038 | 9/1991 | Shepard | 379/88 |
| 5,086,479 | 2/1992 | Takenaga et al. | 382/14 |
| 5,091,947 | 2/1992 | Ariyoshi et al. | 381/42 |
| 5,097,509 | 3/1992 | Lennig | 381/43 |
| 5,127,055 | 6/1992 | Larkey | 381/43 |
| 5,163,083 | 11/1992 | Dowden et al. | 379/88 |
| 5,181,237 | 1/1993 | Dowden et al. | 379/88 |
| 5,204,894 | 4/1993 | Darden | 379/88 |
| 5,226,044 | 7/1993 | Gupta et al. | 370/81 |
| 5,274,695 | 12/1993 | Green | 379/88 |
| 5,307,444 | 4/1994 | Tsuboka | 395/22 |
| 5,390,278 | 2/1995 | Gupta et al. | 395/2.52 |
| 5,488,652 | 1/1996 | Bielby et al. | 704/275 |
| 5,515,475 | 5/1996 | Gupta et al. | 395/2.51 |

FOREIGN PATENT DOCUMENTS

| | | |
|---|---|---|
| 2091658 | 9/1994 | Canada . |
| 0 269 364 A2 | 6/1988 | European Pat. Off. . |
| WO96/13030 | 5/1996 | WIPO . |

OTHER PUBLICATIONS

Rabiner, L. R. and B. H. Juang, "An Introduction to Hidden Markov Models", *IEEE ASSP Magazine*, (Jan. 1986), pp. 4–16.

Bakis, R. and A. G. Cole, "Dynamic Modification of the Vocabulary of a Speech Recognition Machine", *IBM Technical Disclosure Bulletin*, vol. 27, No. 7A, (Dec. 1984), pp. 3945–3946.

Lennig, M. and D. Sharp, "Unleashing the Potential of Human–To–Machine Communcation", *Telesis*, No. 97, pp. 23–27.

Lennig, M., "Putting Speech Recognition to Work in the Telephone Network", *Computer*, (Aug. 1990), pp. 35–41.

Young, S., "Large Vocabulary Continuous Speech Recongnition: a Review", *Proceedings, IEEE Automatic Speech Recognition Workshop*, (Dec. 10–13, 1995), pp. 3–28.

(List continued on next page.)

*Primary Examiner*—David R. Hudspeth
*Assistant Examiner*—Robert Louis Sax

[57] ABSTRACT

The invention relates to an automated directory assistance system that utilizes a heuristics model for predicting the most likely requested number. Each orthography link in the speech recognition dictionary pointing toward an entry in the white pages is associated with a data structure that provides a probability value of that link pointing toward the telephone number intended by the user on the basis of locality information specified by the user of the automated directory assistance system.

7 Claims, 6 Drawing Sheets

OTHER PUBLICATIONS

Lennig et al., "Flexible Vocabulary Recognition Of Speech Over The Telephone", *Bell–Northern Reasearch and INRS–Telecommunications,* pp. 1–3, (1992).

Lennig et al., "Automated Bilingual Directory Assistance Trial in Bell Canada", *Bell–Northern Research,* pp. 1–4.

European Search Report, EP 97 30 9261, Nov. 27, 1998.

Lenning, "Putting Speech Recognition to Work in the Telephone Network", IEEE, Computer, Bell–Northern Research and INRS–Telecommunications, (1990) pp. 35–41.

Gorin et al., "Adaptive Acquisition of Language", Computer Speech and Language, vol. 5, (1990) pp. 101–132.

GAO, "Dynmamic Adaptation of Hidden Markov Model for Robust Speech Recognition", ISCAS, 1989, IEEE, pp. 1336–1339.

AUTOMATED DIRECTORY ASSISTANCE SYSTEM UTILIZING A HEURISTICS MODEL FOR PREDICTING THE MOST LIKELY REQUESTED NUMBER

FIELD OF THE INVENTION

This invention relates to a method and an apparatus for automatically performing desired actions in response to spoken requests. It is particularly applicable to a method and an apparatus for automatically providing desired information in response to spoken requests, as may be used to partially or fully automate telephone directory assistance functions.

BACKGROUND OF THE INVENTION

In addition to providing printed telephone directories, telephone companies provide telephone directory assistance services. Users of these services call predetermined telephone numbers and are connected to directory assistance operators. The operators access directory databases to locate the directory listings requested by the users, and release the telephone numbers of those listings to the users.

Because telephone companies handle a very large number of directory assistance calls per year, the associated labor costs are very significant. Consequently, telephone companies and telephone equipment manufacturers have devoted considerable effort to the development of systems which reduce the labor costs associated with providing directory assistance services.

In a typical directory assistance system the caller is first prompted to provide listing information, in other words to specify in what area resides the business or individual whose telephone number he seeks. If valid speech is detected, the speech recognition layer is invoked in an attempt to recognize the unknown utterance. On a first pass search, a fast match algorithm is used to select the top N orthography groups from a speech recognition dictionary. In a second pass the individual orthographies from the selected groups are re-scored using a more precise likelihood. The top orthography in each of she top two groups are then processed by a rejection algorithm which evaluates if they are sufficiently distinctive from one another so the top choice candidate can be considered to be a valid recognition.

Once the ton choice orthography has been validated by the rejection layer the link established between the orthography and the corresponding entry in the white pages listing of the telephone company is looked at to derive the telephone number of the entity to which the link points to. This situation is very simple and once the correct orthography in the speech recognition dictionary has been identified deriving the corresponding telephone number is easy. In other instances, however, one orthography may point to several entries in the white pages listing. This is typical for complex organizational structures that normally include a root from which originate several leaves. For example, the stores chain "My store" may have several outlets in a metropolitan area. Thus, if the user formulates his request by saying "My store" the speech recognition layer will identify the orthography "My store" as being the most likely match for the spoken utterance. There is, however, no way of knowing which outlet at that particular chain the user is actually seeking. Since any one of the outlets presents a distinct possibility of being the intended entity the orthography "My store" is linked to all entries in the white pages corresponding to the various outlets of the chain.

One possibility of resolution is to use a navigation scheme where the system audibly plays back to the caller a list of possibilities and requests an indication about which one he seeks. This approach to link resolution is not necessarily the best since it requires complex navigational schemes and may annoy the user particularly when the number of links is important. Indeed, the user may be forced to listen for a comparatively long time to a multiple choice question before the requested telephone number can be released.

Thus, there exists a need in the industry to develop an automated directory assistance system that can predict with a reasonable degree of accuracy what link should be selected when an orthography points toward several entries in the white pages listing.

OBJECTS AND STATEMENT OF THE INVENTION

An object of the present invention is to provide an improved automated directory assistance system.

One specific object of the invention is to provide an automated directory assistance system capable of predicting the most likely requested leaf when an orthography points simultaneously coward more than one leaf.

Another specific object of the invention is to provide a method for speech recognition allowing to predict the most likely requested leaf when an orthography points simultaneously toward more than one leaf.

Another specific object of the invention is a computer readable storage medium containing a speech recognition dictionary for use with an automated directory assistance system containing new elements of information to allow resolution between two or more orthography links pointing toward different entities or telephone numbers.

The present inventors have made the unexpected discovery that a sound prediction of the orthography link designating the entity that the user of the automated directory assistance system is seeking can be made by associating to various orthography links of the speech recognition dictionary a probability value conditioned on the locality or geographical area that the user specifies.

As embodied and broadly described herein the invention provides an automated directory assistance system comprising:

means for determining locality information on a basis of a first spoken utterance by a user of said directory assistance system, the locality information being indicative of a geographical area in which an entity whose telephone number the user seeks is potentially located;

a speech recognition dictionary including a plurality of orthographies potentially recognizable on a basis of a second spoken utterance by a user of said automated directory assistance system, each orthography being indicative of a name of an entity whose telephone number is potentially sought by the user;

a plurality of links associated with at least one orthography, each link allowing to derive a telephone number sought by the user;

a plurality of data structures associated with respective links of said speech recognition dictionary, each data structure establishing a correspondence between locality information and probability data, said probability data being indicative of a likelihood that a link points to a telephone number sought by the user.

In a preferred embodiment, the data structure is a table in which are stored a plurality of records, each record including a locality or geographical area and associated probability value. In essence, the locality and the probability value can be seen as fields of the sable. If the locality information recognized as a result of the first spoken utterance by the user is found in the table associated with a given orthography link, the corresponding probability value can be used ton determine the likelihood that this link points to the telephone number sought by the user.

A link associated with an orthography can be any sort of pointer that allows to connect the orthography with the telephone number or any other element of information that leads to the telephone number. Typically, the pointer could be a simple index or record number allowing to search a table containing the telephone numbers of the entities serviced by the automated directory assistance systems. For example, each orthography of the speech recognition dictionary may be associated with one or more record numbers that identify the telephone numbers linked to that orthography. In this case the record numbers provide the linking. When the orthography is accessed, the record numbers are read and used to locate the corresponding telephone numbers that could be stored in a separate table. In a possible variant, the orthographies and the corresponding telephone numbers can be stored in a single table. Under this approach the table itself provides the linking in other words the telephonic numbers and the orthography constitute different fields of the table. Thus, once the orthography is accessed, the corresponding telephone numbers are immediately available. This variant may not be optimal, however, since any changes to links, say addition of links, displacement of links or removal of links requires to re-write telephone numbers that may be time-consuming task. From this perspective the former approach is more flexible since it suffices to change the record numbers or indices associated with the orthography to perform link updating procedures.

In a most preferred embodiment, once the locality information has been obtained from the user, the speech recognition layer is invoked to recognize the second utterance, the one that identifies a particular orthography. In a very specific example a two pass search can be used to perform this function. On a first pass, a fast match algorithm is used to select the top N orthography groups from a speech recognition dictionary. In a second pass the individual orthographies from the selected groups are re-scored using a more precise likelihood. The speech recognition layer then outputs the top choice orthography that is then processed by the rejection layer. If the orthography is accepted, the links established between the orthography and the telephone numbers in the white pages listing are examined. If a single link exists, this represents an unambiguous situation and the telephone number is released. If multiple links are present, the tables associated with each link are searched for the locality information provided by the user. The probability value corresponding to that locality is extracted from each table and the link possessing the highest probability value is deemed to be the one pointing toward the telephone number the user wants.

The probability of a given orthography link pointing toward the telephone number requested by the user, conditioned on the specified locality is a powerful tool to allow a more precise resolution when an orthography includes multiple links that point to different telephone numbers. Indeed, there is a higher probability that a link pointing toward the telephone number of an entity residing in the specified locality is the correct one, rather than a link pointing toward a telephone number of an entity that is geographically remote from the specified locality. Thus, by penalizing links that point elsewhere than the specified locality, or conversely favoring links pointing to or close to the specified locality the probability of making a correct choice can be significantly increased.

As embodied and broadly described herein the invention also provides a method for performing speech recognition in an automated directory assistance system said method comprising the steps of:

a) analyzing a first spoken utterance by a user of the directory assistance system for determining locality information, the locality information being indicative of a geographical area in which an entity whose telephone number the user seeks is potentially located;

b) providing a speech recognition dictionary including a plurality of orthographies potentially recognizable on a basis of a second spoken utterance by a user of said automated directory assistance system, each orthography being indicative of a name of an entity whose telephone number is potentially sought by the user, said speech recognition dictionary also including a plurality of link associated with at least one orthography, each link allowing to derive a telephone number sought by the user, said speech recognition dictionary further including a plurality of data structures associated with respective links of said speech recognition dictionary, each data structure establishing a correspondence between locality information and probability data, said probability data being indicative of a likelihood that a link points to a telephone number sought by the user;

c) analyzing a second spoken utterance by the user of the directory assistance system;

d) searching said speech recognition dictionary to derive an orthography as being a potential match for the second spoken utterance;

e) searching the data structure associated with a link associated with the orthography derived at step d) to locate the probability data corresponding to the locality information determined at step a);

f) utilizing the probability data determined at step e) for selecting at least one link that potentially points to a telephone number sought by the user.

As embodied and broadly described herein the invention further provides a machine readable storage medium containing a speech recognition dictionary for use in an automated directory assistance systems that includes a speech recognition layer, said speech recognition dictionary including:

a plurality of orthographies potentially recognizable on a basis of a spoken utterance by a user of said automated directory assistance system, each orthography being indicative of a name of an entity whose telephone numbers potentially sought by the user;

a plurality of links associated with at least one orthography, each link allowing to derive a telephone number sought by the user;

a plurality of data structures associated with respective links of said speech recognition dictionary, each data structure establishing a correspondence between locality information and probability data, said probability data being indicative of a likelihood that a link points to a telephone number sought by the user.

DESCRIPTION OF A PREFERRED EMBODIMENT

Figure 1:
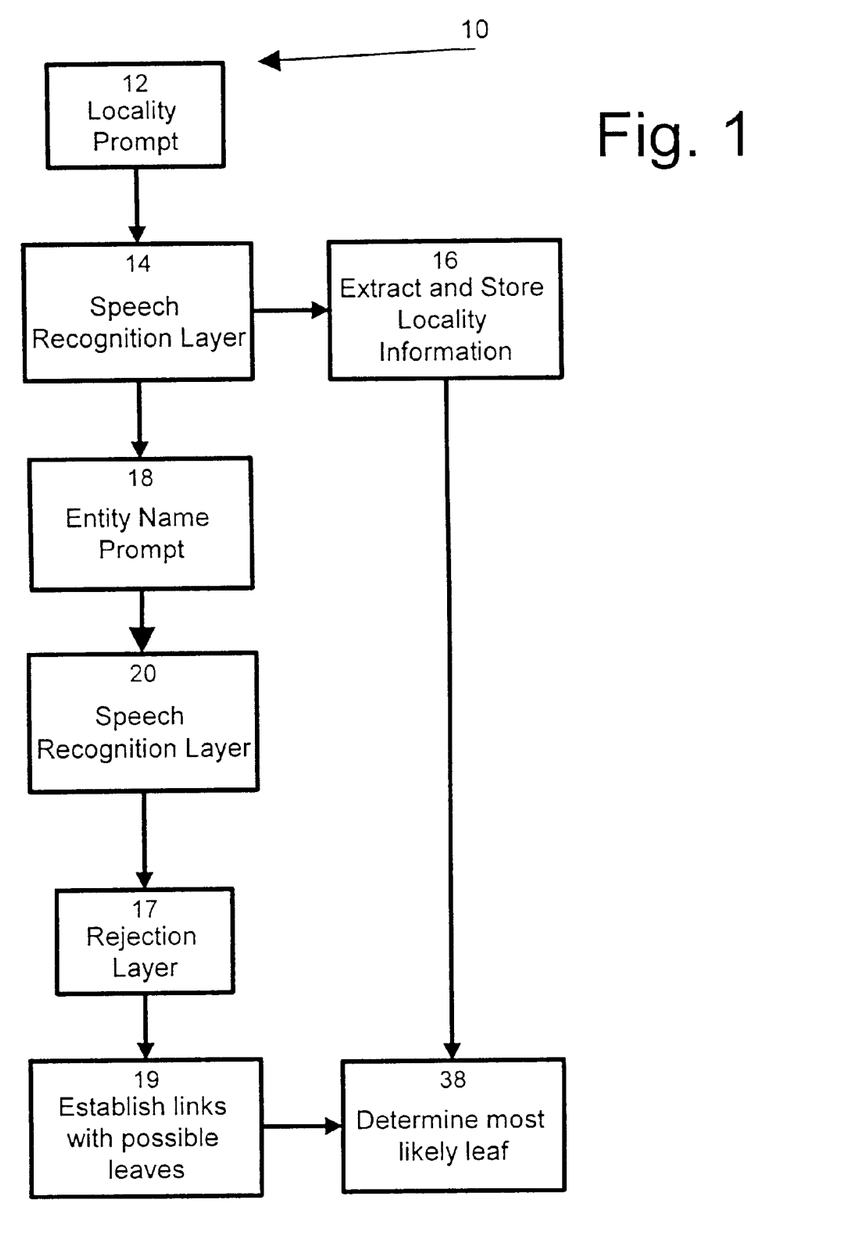
FIG. 1 is a functional block diagram illustrating the operation of an autuomated directory assistance system.

From a functional point of view, an automated directory assistance system includes several layers. This is best shown at FIG. 1 of the drawings. At step 12 the system prompts the user to provide listing information, such as the locality in which the business or individual whose phone number is requested are located. If valid speech is detected, the speech recognition layer is invoked at step 14. The speech recognition layer tries to match the detected vocal tract signal with entries made in a speech recognition dictionary and selects the entry (hereinafter called "orthography") that is the most likely to be what the caller is saying. This is accomplished by using a fast match algorithm which computes a rough likelihood for all the phrases in the speech recognition dictionary and then ranks the top choices. All the top orthographies are then re-scored using more precise likelihood. In this particular case the speech recognition layer tries to determine the locality, or geographical area corresponding to the utterance. Once a correct resolution has been made the identified locality is stored as shown at step 16 for further processing. At step 18 of the operation the user is prompted to provide the name of the entity whose telephone number he seeks. Again if valid speech is detected the speech recognition layer is invoked at step 20 in an attempt to match the second spoken utterance with an orthography from a speech recognition dictionary that contains the names of all entities serviced by the automated directory assistance system.

The top choice orthography and the rejection parameters are output to the rejection layer that processes the rejection parameters at step 17 and determines if the choice should be accepted or rejected. In essence, if the probability of the top choice being a correct answer exceeds a certain threshold the top choice orthography is accepted. Otherwise, it is rejected. The rejected token is then directed to a human operator that will process the request.

Figure 2:
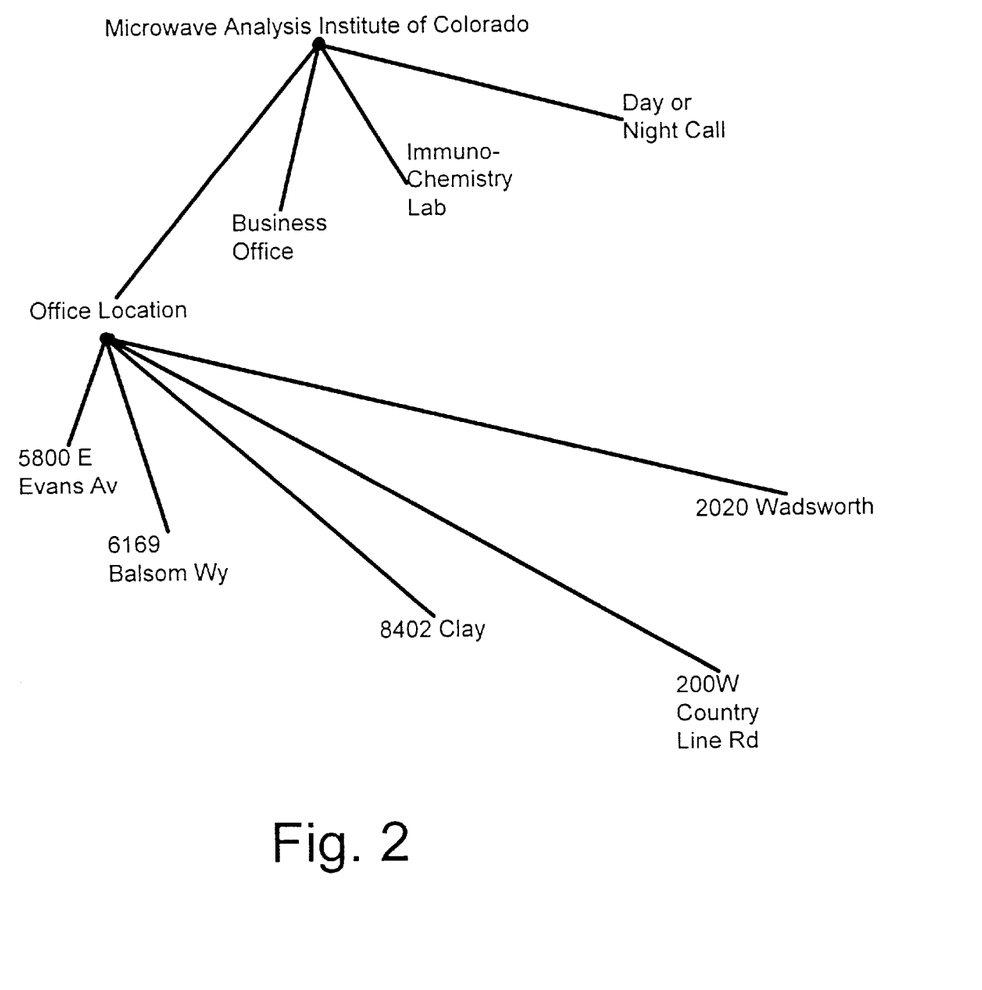
FIG. 2 illustrates graphically a typical tree representing the structure of a business listing.

If the top choice orthography is accepted, the links affiliated with this top choice are fetched by the link layer at step 19. The link(s) is directed to the corresponding entry in the white pages of the telephone company that provide the telephone number corresponding to the entity or business that the caller seeks. In the following derscription the expression "white pages" should be construed to mean essentially a table providing a listing of telephone numbers and perhaps corresponding names of entities, such as individuals or businesses. For example, if the top choice orthography is "Nichols, Jim" a link is established with the entry corresponding to this name in the white pages. In many instances, particularly where a business name is being looked at, several links may be established. Take for example the name "Bill's" which may point to a restaurant "Bill's" or to a bar or a service station of the same name. In such case, several links will be established with all the "Bill's" entries in the white pages. Multiple linking is typical for large organizational structures of the type illustrated in FIG. 2. The hierarchical structure normally includes a root from which originate a plurality of leaves. In the specific example shows the root is "Microwave Analysis Institute of Colorado". From that root originate for leaves namely "Office location.", "Business Office", "Immunochemistry lab" and "Day or night call". From the "Office location" leaf originate 5 sub-leaves associated with offices at different civic addresses. The various leaves and the root in a caption set are entered in the speech recognition dictionary without any specific association between them. In other words, each member of the caption set either root or leaf constitutes ail Independent orthography. In reality, each entity of the speech recognition dictionary can be represented as an orthography set, each orthography of the set reflecting a possible way a user may request that particular entity. For more information the reader is invited to consult the co-pending application filed in the U.S. patent and trademark Office by the same inventors on Nov. 29, 1996 and entitled "METHOD AND APPARATUS FOR GENERATING A SPEECH RECOGNITION VOCABULARY".

Figure 2A:
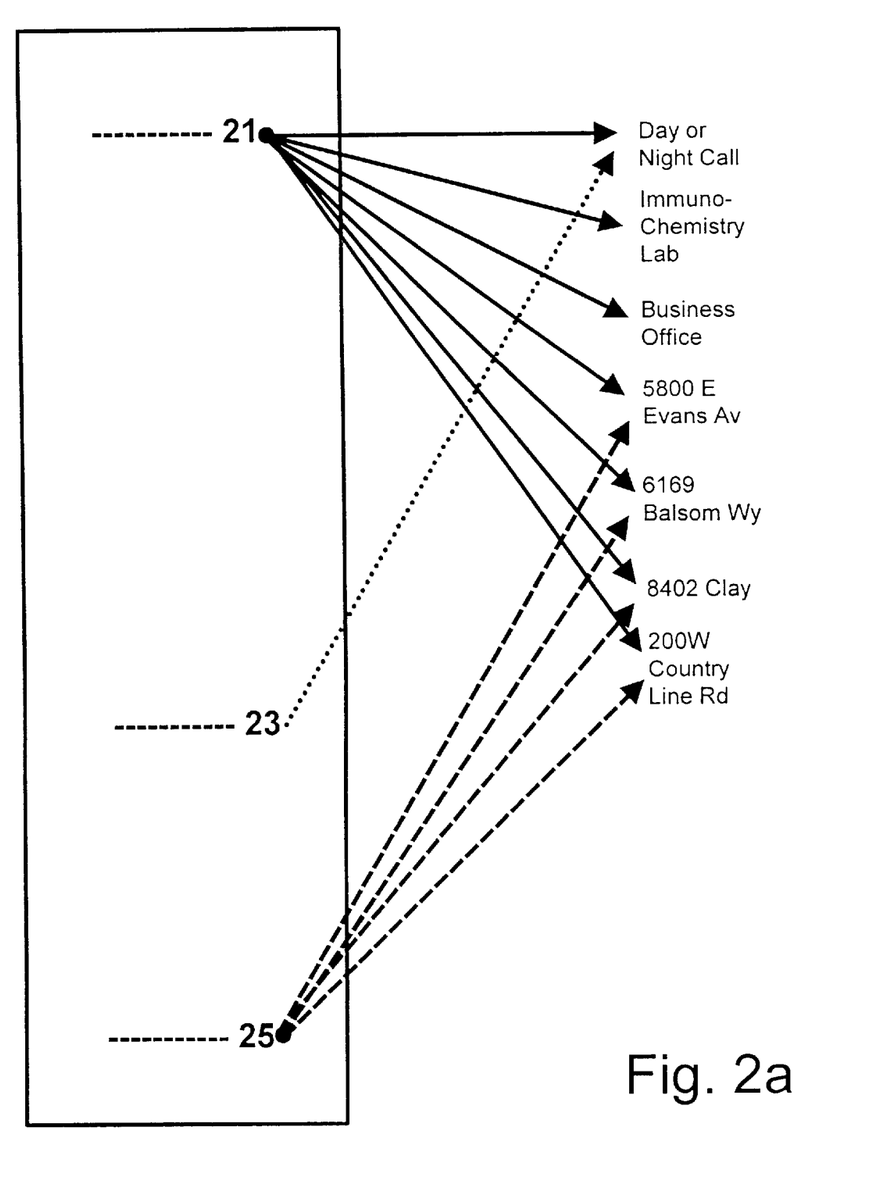
FIG. 2a illustrates the linking established between orthographies identifying individual leaves of the tree shown in FIG. 2 and corresponding telephone numbers.

FIG. 2a of the drawings illustrates in greater detail the relationship existing between orthographies and entries in the white pages listing that allow the release of a telephone number on a basis of a recognized orthography. For the purpose of the example assume that the dictionary contains three orthographies, namely:

1) orthography 21 "Microwave Analysis Institute of Colorado";

2) orthography 23 "Microwave Analysis Institute of Colorado—Day or Night Call";

3) orthography 25 "Microwave Analysis Institute of Colorado—Office Location";

If the speech recognition layer determines that the orthography that is most, likely to correspond to the spoken utterance is "Microwave Analysis Institute of Colorado", i.e. orthography 21, the system must then make the resolution between 7 links (solid lines) to determine which one of the seven locations the caller is actually seeking so the proper telephone number can be released. In this example, the orthography 21 leads to the largest number of leaves. In the case of orthography 23, the caller is deemed to have said "Microwave Analysis Institute of Colorado—Day or Night Call". Here, the orthography leads (small dots line arrow) to a single leaf in the tree. Thus, there is no need to perform any link resolution. In the third example, the caller has formulated his request by saying "Microwave Analysis Institute of Colorado—Office Location" (orthography 2) ). That orthography links with four possible entries in the white pages listings.

It should be noted that the linking process, i.e., the number of entries in the white pages listing to which a given orthography points to is a question of choice and it is established during the commissioning phase of the system. In essence, a link between an orthography and an entry in the white pages listing is created when the orthography may be matched to an utterance that could have been intended to designate that particular entry. In large organizational structures, the orthography consistency solely of the name of the root, say "Store ABC" will normally be linked to all the outlets (leaves) of the store chain, since when the caller says "Store PBC" he may mean anyone of the outlets.

The speech recognition dictionary and the white pages listing may be viewed conceptually as two tables, the first containing the orthographies, while the other one containing the telephone numbers and perhaps other useful information such as complete names of the entities serviced by the system. The links are pointers or vectors that allow to associate a given orthography with a specific group or entries. In a specific example, a pointer could be a simple index or record number allowing to search the table containing the telephone numbers of the entities serviced by the automated directory assistance system. For example, each orthography or the speech recognition dictionary may be associated with one or more record numbers that identify the telephone numbers linked to that orthography. In this particular case the record numbers provide that linking. When the orthography is accessed, the record numbers are read and used to locate the corresponding telephone numbers that could be stored in a separate table. In a possible variant, as discussed earlier, the linking may be established by placing the orthographies and the telephone numbers in the same table.

The selection of an orthography from the speech recognition dictionary is made solely on the basis of an acoustic match with the second spoken utterance. If that orthography points to a single entry in the white pages listing (a single link) it suffices to release the telephone number associated with the entry to which the or orthography points to in order to complete the transaction. A difficulty arises, however, in cases where the orthography points to multiple entries in the white pages listing. One possible way to provide a resolution is to request further information from the user, audibly listing to the caller the various choices and asking for an indication which entry he seeks. Such dialogue schemes, however, are complex and not necessarily desirable in all circumstances.

The present inventors have made the unexplored discovery that such stations can be resolved by associating with each leaf pointed to by an orthography a data structure in the form of a table that provides a list of probability values of that particular leaf being requested by the user conditioned on locality and of course recognized orthography.

Figure 3:
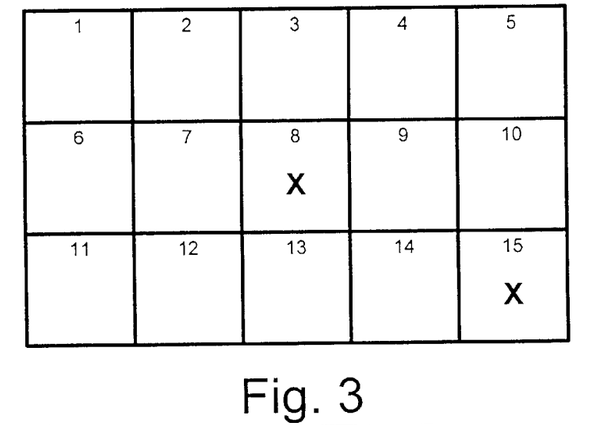
FIG. 3 graphically Illustrates a metropolitan area segmented in a plurality of localities.

An example of this feature is shown at FIG. 3 of the drawings. The various rectangles numbered from 1 to 15 identify different localities of a metropolitan areas. Assume for the purpose of the example that the user seeks the telephone number of an outlet of the chain "ABC". Two outlets of the chain exist in the metropolitan area one in locality No. 8 and the other in locality No. 15. If the caller during the first phase of its interaction with the directory assistance system has specified locality No. 8, it is logical to assume that the link pointing from orthography "ABC" toward the outlet in that locality should be favored over the link toward the outlet in locality No. 15.

Figure 4:
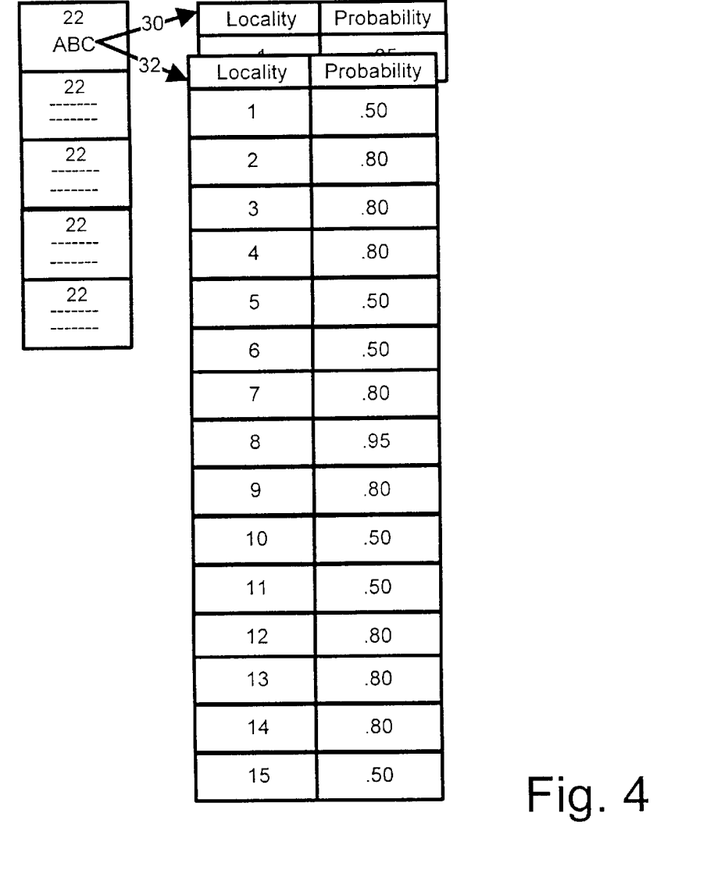
FIG. 4 illustrates the structure of the speech recognition dictionary in accordance with the invention.

One possible way to implement this strategy is to associate with every link in the speech recognition dictionary a data structure that establishes a relationship between the locality specified by the user and a probability value that the particular link points toward the entity requested by the user. FIG. 4 illustrates the structure of such speech recognition dictionary. The dictionary contains a plurality of orthographies organized in several groups 22. Note that such grouping is not essential as the inventive concept applies to speech recognition dictionaries where the entries are not grouped in any way. Each orthography links with one or more entries in the white pages listing (not shown in the drawings. In the example shown, the orthography "ABC" has two links, 30 and 32. The link 32 points toward the outlet in locality No. 8, while the link 30 points to the outlet in locality 15. Each link is associated with a data structure in the form of a table that contains two fields namely a "Locality" field and "Probability value" field. For each locality susceptible to be specified by the user the table provides a corresponding probability value. In the example illustrated at FIG. 3, the user has specified locality No. 8 that contains an "ABC" outlet. In the table associated with this orthography the locality No. 8 corresponds to the highest probability value (0.95). The surrounding localities point to somewhat lesser probability values. More specifically, localities 2, 3, 4, 7, 9, 12, 13 and 14 correspond to probability values of 0.80. This means that if the user has specified any one of those localities there is a likelihood of 0.8 that the "ABC" outlet located in locality No. 8 is the one desired. This feature is particularly interesting because it allows the system to generate correct responses in cases where the wrong locality information is supplied by the user. For example, the user may not know or erroneously think that the "ABC" outlet is located in locality No. 2. By associating a comparatively high probability value to that locality in the table, since locality No. 2 in geographically close to locality No. 8, the link 30 can still come up as a top choice. As for localities 1, 5, 6, 10, 11 and 15 the probability value associated therewith are significantly reduced because it is unlikely that the user will specify any one of these zones when seeking the outlet "ABC" in locality No. 8.

An important element of the invention is the proprietary nature of the links between orthographies and telephone numbers in the white pages. In other words, each link is associated with a given orthography and cannot be shared with other orthographies. Thus, if two orthographies point to the same entry in the white pages, this would imply the existence of two separate links. In reality, the links may be physically the same (the same index or record number), however, the probability table associated with the link will differ in dependence of the orthography that in being recognized. However, the present inventive concept can be expressed more accurately by associating to a link a proper and unique probability table and making the link proprietary to a given orthography. Thus, even though two different orthographies point to the same entry in the white pages by using some common link instrument (same or substantially same record or index number), two separate link will be deemed to exist by virtue of the assignment of a different probability table to each link instrument/orthography combination.

In the above examples, the probability associated with a given link is independent on the geographical proximity between the entity to which the link points and locality specified by the user. This rule, however, is merely one possibility and does not reflect an essential element of the invention. The way the probability value could be associated with the given locality may be further conditioned on other factors such as particular calling patterns, time of day during which calls are made, and other possible factors. As a possible example, the probability conditioned on locality may also be conditioned on time of day for businesses or institutions whose telephone numbers are more likely to be requested at certain times in a 24 hour span. For example the law firm "Bill's and Bill's" is less likely to be requested during the night than a restaurant of the same or of acoustically similar name. So, if a call is made during the late hours the link associated with the restaurant should be favored.

Note that in the above examples the localities illustrated in FIGS. 3 and 4 are designated by members. This was done for convenience only as in reality each locality will have a distinct name.

The probability values associated with different localities in the table for each orthography can be generated from actual call records collected by the telephone company. Each call record contains the following elements of information:

1) locality recognized by the speech recognition layer on the basis of the first spoken utterance;
2) telephone number released during the transaction.

Since the link map of the speech recognition dictionary (what orthography links to what entries in the white pages) is known, one can derive or the basis of the telephone number the orthography pointing toward that entry. On the basis of this data, the probability that a given leaf is requested may be estimated by the following formula:

$$\text{Probability}_{leaf} = \frac{\text{Count[Recognized locality, specific leaf]}}{\text{Count[Recognized locality, any leaf]}}$$

Figure 5:
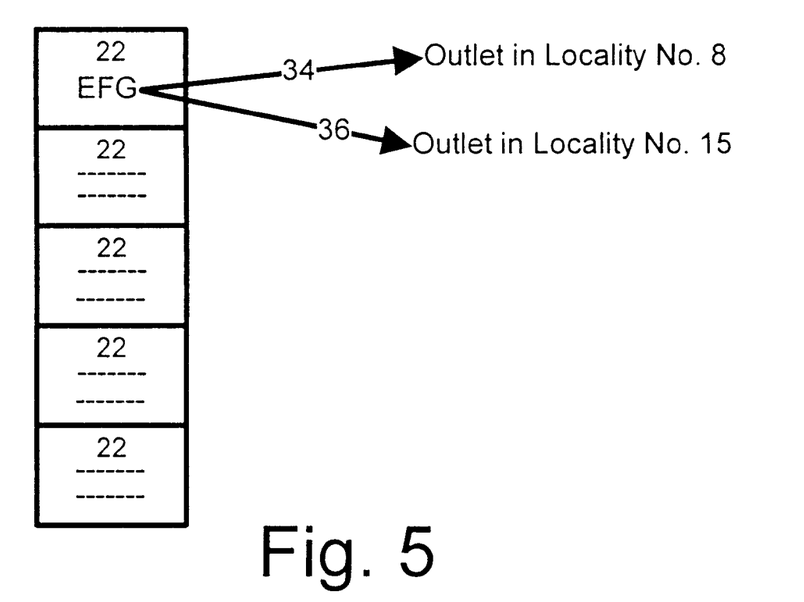
FIG. 5 illustrates the structure of a speech is recognition dictionary according to the invention and the associated links.

Take the example of the "EFG," company that has two outlets. As shown at FIG. 5, the "EFG" orthography has two links 34,36 that point to two entries in the white pages, one associated with the outlet in locality No. 8 and the other associated with the outlet in locality No. 15. The call records provide the following data:

| CALL RECORD NUMBER | RECOGNIZED LOCALITY | RELEASED TELEPHONE NUMBER | CORRESPONDING OUTLET |
|---|---|---|---|
| 1 | 8 | 223-4567 | Locality 8 |
| 2 | 7 | 223-4567 | Locality 8 |
| 3 | 8 | 223-4567 | Locality 8 |
| 4 | 6 | 223-4567 | Locality 8 |
| 5 | 15 | 334-5678 | Locality 15 |
| 6 | 1 | 334-5678 | Locality 15 |
| 7 | 8 | 334-5678 | Locality 15 |
| 8 | 7 | 223-4567 | Locality 8 |
| 9 | 1 | 223-4567 | Locality 8 |
| 10 | 15 | 334-5678 | Locality 15 |
| 11 | 6 | 223-4567 | Locality 8 |
| 12 | 6 | 334-4567 | Locality 15 |
| 13 | 7 | 334-4567 | Locality 15 |
| 14 | 15 | 223-4567 | Locality 8 |
| 15 | 8 | 223-4567 | Locality 8 |

On the basis of this data the following tables can be constructed for the links 34 and 36:

Link 34
Locality No. 8
a) The expression Count[Recognized locality, specific leaf] evaluates to 3 (records 1, 3 and 15);
b) the expression Count[Recognized locality, any leaf] evaluates to 4 (records 1, 3, 7 and 15). Thus $P_{leaf}$ is 0.75.
Locality No. 7
a) the expression Count [Recognized locality, specific leaf] evaluates to 2 (records 2 and 8);
b) the expression Count[Recognized locality, any leaf] evaluates to 3 (records 2, 8 and 13). Thus $P_{leaf}$ is 0.66.
Locality No. 6
a) the expression Count[Recognized locality, specific leaf] evaluates to 2 (records 4 and 11);
b) the expression Count [Recognized locality, any leaf] evaluates to 3 (records 4, 11 and 12). Thus $P_{leaf}$ is 0.66.
Locality No. 1
a) the expression Count[Recognized locality, specific leaf] evaluates to 1 (record 9);
b) the expression Count[Recognized locality, any leaf] evaluates to 2 (records 9 and 6)). Thus $P_{leaf\ is}$ 0.5.
Locality No. 15
a) the expression Count[Recognize locality, specific leaf] evaluates to 1 (record 14);
b) the expression Count[Recognized locality, any leaf] evaluates to 3 (records 5, 10 and 14). Thus $P_{leaf}$ is 0.33.

Link 36
Locality No. 8
a) The expression Count[Recognized locality, specific leaf] evaluates to 1 (record 7);
b) the expression Count[Recognized locality, any leaf] evaluates to 4 (records 1, 3, 7 and 15). Thus $P_{leaf}$ is 0.25.
Locality No. 7
a) the expression Count[Recognized locality, specific leaf] evaluates to 1 (record 13);
b) the expression Count[Recognized locality, any leaf] evaluates to 3 (records 2, 3 and 13). Thus $P_{leaf}$ is 0.33.
Locality No. 6
a) the expression Count[Recognized locality, specific leaf] evaluates to 1 (record 12);
b) the expression Count (Recognized locality, any leaf evaluates to 3 records 4, 11 and 12). Thus $P_{leaf}$ is 0.33.
Locality No. 1
a) the expression Count[Recognized locality, specific leaf] evaluates to 1 (record 6);
b) the expression Count[Recognized locality, any leaf] evaluates to 2 (records 9 and 6). Thus $P_{leaf}$ is 0.5.
Locality No. 15
a) the expression Count[Recognized locality, specific leaf] evaluates to 2 (records 5 and 10);
b) the expression Count[Recognized locality, any leaf] evaluates to 3 (records 5, 10 and 14). Thus $P_{leaf}$ is 0.66.

This provides the following probability tables:

| LOCALITY | PROBABILITY VALUE |
|---|---|
| | LINK 34 |
| 8 | .75 |
| 7 | .66 |
| 6 | .66 |
| 1 | .50 |
| 15 | .33 |
| | LINK 36 |
| 8 | .25 |
| 7 | .33 |
| 6 | .33 |
| 1 | .50 |
| 15 | .66 |

Figure 1A:
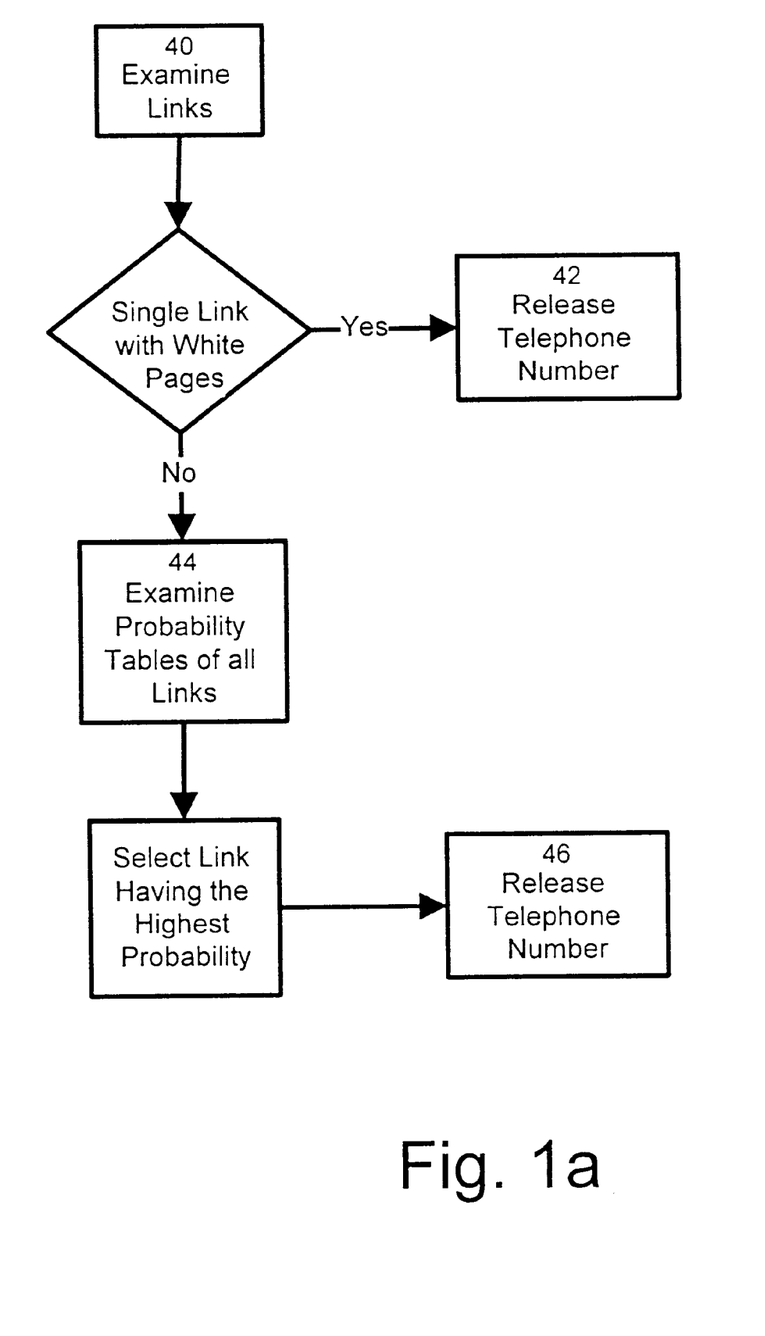
FIG. 1a illustrates a detail of the method depicted in FIG. 1.

The above described concept of selecting links based on locality specified by the caller can be implemented in the automated directory assistance system as shown, at step 38 in FIG. 1. The step 38 is depicted in greater detail at FIG. 1a. Once the orthography selected by the speech recognition layer as being the best possible match for the spoken utterance as output, the links associated with this orthography are identified, as shown at step 40. If one link exists, there is no possible ambiguity and the telephone number associated with the given leaf is released at step 42. However, if multiple links are present, the recognized locality information extracted and stored at step 16 is retrieved. The tables associated with each link are searched and the probability values corresponding to the recognized locality extracted, as shown at step 44. The selected link is the one possessing the highest probability value. The corresponding telephone number is then released at step 46. This operation, along with all the other steps necessarily to implement the speech recognition method is conducted on a suitably programmed computer that will not be described here in detail.

The above described method can be used to eliminate navigation, i.e., the necessity to establish a dialog with the caller in order to identify the desired link, or reduce the navigation required to reach a given leaf. For instance, the leaf prediction method may be used to release the telephone number associated with a given, leaf only when the probability associated with this loaf is very high. If the probability value is below a predetermined value, say 0.75, the navigation scheme may then be invoked since the leaf prediction method may not be very reliable.

For more information on the general structure and detailed operation of an automated directory assistance system the reader may refer to the following documents whose contents are hereby incorporated by reference.

U.S. PATENTS

| Patent # | Inventor |
| --- | --- |
| 5,488,652 | Gregory, J. Bielby et al. |
| 4,164,025 | Dubnowski et al. |
| 4,751,737 | Garson et al. |
| 4,797,910 | Daudelin |
| 4,959,855 | Daudelin |
| 4,979,206 | Fadden et al. |
| 5,050,215 | Nishimura |
| 5,052,038 | Shepard |
| 5,091,947 | Artycehl et al. |
| 5,097,609 | Lennig |
| 5,127,055 | Larkey |
| 5,163,083 | Dowden et al. |
| 5,181,237 | Dowden |
| 5,204,894 | Darden |
| 5,274,695 | Green |
| 5,515,475 | Gupta et al. |
| 5,307,444 | Tsuboka |
| 4,751,736 | Gupta et al. |
| 5,226,044 | Gupta et al. |
| 4,956,885 | Lenning et al. |
| 5,390,278 | Gupta et al. |
| 5,088,479 | Takenaga et al. |

PRIOR ART

| TITLE | AUTHOR | SOURCE |
| --- | --- | --- |
| Dynamic Adaptation of Hidden Markov Model for Robust Speech Recognition | | 1989, IEEE International Symposium on Circuits and Systems, vol. 2, May 1989 pp. 1336–1339 |
| Dynamic Modification of the Vocabulary of a Speech Recognition Machine | | IBM Technical Disclosure Bulletin, vol. 27, No. 7A, Dec. 1984 |
| Adaptive Acquisition of Language | Gonn et al. | Computer Speech and Language, vol. 5, No. 2 Apr. 1991, London, GB, pp. 101–132 |
| Automated Bilingual Directory Assistance Trial in Bell Canada | Lenning et al. | IEEE Workshop on Interactive Voice Technology for Telecom Applications, Piscataway, NJ. Oct. 1992. |
| Unleashing The Potential of Human-To-Machine Communication | Labov and Lennig, | Telesis, Issue 97, 1993, pp. 23–27 |
| An introduction To Hidden Markov Models | Rabiner and Juang | IEEE ASSP Magazine, Jan. 1988, pp. 4–16 |
| Putting Speech Recognition to Work in The Telephone Network | Lennig, | Computer, published by IEEE Computer Society, vol. 23, No 8, Aug. 1990 |
| Flexible Vocabulary Recognition of Speech Over The Telephone | Lennig et al. | IEEE Workshop on Interactive Voice Technology for Telecom Applications, Piscataway, NJ, Oct. 1992 |
| Mobile Robot Control by a Structural Hierarchical Neural Network | | Nagata et al. pp. 69–76, 1989 |
| Large Vocabulary Continuous Speech Recognition: a Review | Steven Young | IEEE Automatic Speech Recognition Workshop, September 16, 1995 |
| Putting Speech Recognition to Work in the Telephone Network | Matthew Lennig | IEEE (August 1990) reprinted from Computer |

The above description of a preferred embodiment should not be interpreted in any limiting manner since variations and refinements can be made without departing from the spirit of the invention. The scope of the invention is defined in the appended claims and their equivalents.

I claim:

1. An automated directory assistance system comprising:
   a speech recognition dictionary including:
   a) a set of vocabulary items potentially recognizable on a basis of a spoken utterance by the user of said automated directory assistance system, each vocabulary item representing a name of an entity whose telephone number is potentially sought by the user, said set including a plurality of multi-entity vocabulary items, each of said multi-entity vocabulary items being representative of a plurality of entities having different telephone numbers;
   b) a plurality of links associated with each multi-entity vocabulary item, each link being operative to derive the telephone number of a respective one of the entities represented by the multi-entity vocabulary item;
   c) a plurality of data structures, each link of a multi-entity vocabulary item being associated with a respective data structure, each data structure comprising a plurality of data structure entries, each data structure entry establishing a correspondence between a locality information data element and a probability data element, said data structure permitting to derive a likelihood that the link associated to the data structure points to a telephone number sought by the user;
   an input for receiving:
   i) a first signal derived from a first spoken utterance spoken by a user of said automated directory assistance system, said spoken utterance being representative of a certain multi-entity vocabulary item;
   ii) a second signal derived from a second spoken utterance spoken by a user of said automated directory assistance system, said second spoken utterance being representative of a certain locality data element;
   a processing unit characterized by:
   i) said processing unit being responsive to the first signal for selecting a certain multi-entity vocabulary item as being a match to the first spoken utterance;
   ii) said processing unit being responsive to the second signal for selecting a certain locality data element as being a match to the second spoken utterance;
   iii) said processing unit being operative to process the data structures associated with links of the multi-entity vocabulary item selected as being a match to the first spoken utterance to extract from the data structures the probability data elements corresponding to the certain locality data element selected as being a match to the second spoken utterance;

iv) said processing unit being operative for releasing through an output a signal representative of the telephone number derived from the link associated with the probability data element that is highest amongst the probability data elements extracted from the data structures associated with links of the multi-entity vocabulary item selected as being a match to the first spoken utterance.

2. An automated directory assistance system as defined in claim 1, wherein the locality information data elements in a given data structure are representative of localities characterized by geographical proximity.

3. A method for performing speech recognition in an automated directory assistance system, said method comprising the steps of:

providing a speech recognition dictionary, said speech recognition dictionary including:
  a) a set of vocabulary items potentially recognizable on a basis of a spoken utterance by the user of said automated directory assistance system, each vocabulary item representing a name of an entity whose telephone number is potentially sought by the user, said set including a plurality of multi-entity vocabulary items, each of said multi-entity vocabulary items being representative of a plurality of entities having different telephone numbers;
  b) a plurality of links associated with each multi-entity vocabulary item, each link being operative to derive the telephone number of a respective one of the entities represented by the multi-entity vocabulary item;
  c) a plurality of data structures, each link of a multi-entity vocabulary item being associated with a respective data structure, each data structure comprising a plurality of data structure entries, each data structure entry establishing a correspondence between a locality information data element and a probability data element, said data structure permitting to derive a likelihood that the link associated to the data structure points to a telephone number sought by the user;

receiving a first signal derived from a first spoken utterance spoken by a user of said automated directory assistance system, said first spoken utterance being representative of a certain multi-entity vocabulary item;

receiving a second signal derived from a second spoken utterance spoken by a user of said automated directory assistance system, said second spoken utterance being representative of a certain locality data element;

processing the first signal and selecting a certain multi-entity vocabulary item as being a match to the first spoken utterance;

processing the second signal to select a certain locality data element as being a match to the second spoken utterance;

processing the data structures associated with links of the multi-entity vocabulary item selected as being a match to the first spoken utterance to extract from the data structures the probability data elements corresponding to the certain locality data element selected as being a match to the second spoken utterance;

releasing through an output a signal representative of the telephone number derived from the link associated with the probability data element that is highest amongst the probability data elements extracted from the data structures associated with links of the multi-entity vocabulary item selected as being a match to the first spoken utterance.

4. A method as defined in claim 3, further comprising the step of searching the data structure associated with each link of a given multi-entity vocabulary item to extract a likelihood and comparing the respective likelihoods of each of the links to select one of the links as being the most likely to point toward the telephone number sought by the user.

5. An automated directory assistance system as defined in claim 4, wherein the locality information data elements in a given data structure are representative of localities characterized by geographical proximity.

6. A machine readable storage medium containing a speech recognition dictionary for use in an automated directory assistance system that includes a speech recognition layer, said speech recognition dictionary including:

a set of vocabulary items potentially recognizable on a basis of a spoken utterance by a user of said automated directory assistance system, each vocabulary item representing a name of an entity whose telephone number is potentially sought by the user, said set including a plurality of multi-entity vocabulary items, each of said multi-entity vocabulary items being representative of a plurality of entities having different telephone numbers;

a plurality of links associated with each multi-entity vocabulary item, each link being operative to derive the telephone number of a respective one of the entities represented by the multi-entity vocabulary item;

a plurality of data structures, each link of a multi-entity vocabulary item being associated with a respective data structure, each data structure comprising a plurality of data structure entries, each data structure entry establishing a correspondence between a locality information data element and a probability data element, said data structure permitting to derive a likelihood that the link associated to the data structure points to a telephone number sought by the user, on a basis of a certain locality information data element.

7. An automated directory assistance system as defined in claim 6, wherein the locality information data elements in a given data structure are representative of localities characterized by geographical proximity.

* * * * *

UNITED STATES PATENT AND TRADEMARK OFFICE
CERTIFICATE OF CORRECTION

PATENT NO. : 5,987,408

DATED : November 16, 1999

INVENTOR(S) : Vishwa GUPTA et al.

Page 1 of 2

It is certified that error appears in the above-identified patent and that said Letters Patent is hereby corrected as shown below:

Column 1, line 36, change « so » to --to--
Column 1, line 40, change « she » to --the--
Column 1, line 44, change « ton » to --top--
Column 1, line 61, change « at » to --of--
Column 2, line 22, change « coward » to --toward--
Column 3, line 6, change « ton » to --to--
Column 3, line 25, change « telephonic » to --telephone--
Column 3, line 31, add the word --a-- after « that may be »
Column 4, line 20, change « link » to --links--
Column 4, line 45, change « systems » to --system--
Column 4, line 52, change « numbers » to --number--
Column 4, line 52, add the word --is-- after « number »
Column 4, line 65, change « autuomated » to --automated--
Column 5, line 6, change « Illustrates » to --illustrates--
Column 5, line 11, delete the word « is »
Column 5, line 57, change « derscription » to --description--
Column 6, line 6, change « shows » to --shown--
Column 6, line 7, change « for » to --four--
Column 6, line 14, change « ail » to --an--
Column 6, line 15, change « Independent » to --independent--
Column 6, line 38, delete « , » after the word « most »
Column 6, line 62, change « consistency » to --consisting--
Column 6, line 65, change « PBC » to --ABC--
Column 7, line 5, change « or » to --of--
Column 7, line 10, change « or » to --of--
Column 7, line 13, change « that » to --the--
Column 7, line 25, delete « or » after the words « to which the »

UNITED STATES PATENT AND TRADEMARK OFFICE
CERTIFICATE OF CORRECTION

PATENT NO. : 5,987,408

DATED : November 16, 1999

INVENTOR(S) : Vishwa GUPTA et al.

It is certified that error appears in the above-identified patent and that said Letters Patent is hereby corrected as shown below:

Column 7, line 34, change « unexplored » to --unexpected--
Column 7, line 63, after « drawings » add --)--
Column 8, line 22, change « value » to --values--
Column 8, line 42, change « link » to --links--
Column 9, line 10, change « or » to --on--
Column 10, line 18, change « 2.3 » to --2.8--
Column 10, line 58, change « as » to --is--
Column 11, line 11, delete « , » after « given »
Column 11, line 12, change « loaf » to --leaf--
Column 11, line 27, change « Garson » to --Gerson--
Column 11, line 29, change « Fadden » to --Padden--
Column 11, line 32, change « Artycehl » to --Ariyoshi--
Column 11, line 53, change « Gonn » to --Gorin--

Signed and Sealed this

Fifteenth Day of August, 2000

Attest:

Attesting Officer

Q. TODD DICKINSON

Director of Patents and Trademarks

UNITED STATES PATENT AND TRADEMARK OFFICE
CERTIFICATE OF CORRECTION

PATENT NO. : 5,987,408
DATED : November 16, 1999
INVENTOR(S) : Vishwa Gupta

It is certified that error appears in the above-identified patent and that said Letters Patent is hereby corrected as shown below:

Column 1,
Line 48, after "points" delete -- to --.
Line 49, after "and" insert -- , --.
Line 50, after "identified" insert -- , --.
Line 63, after "entity" insert -- , --.

Column 2,
Line 24, change "to predict" to -- prediction of --.

Column 3,
Line 2, change "sable" to -- table --.
Line 9, change "to connect" to -- connection of --.
Line 12, change "to search" to -- searching of --.
Line 30, after "links" insert -- ; --.
Line 30, change "to re-write" to -- re-writing of --.
Line 59, after "locality" insert -- , --.

Column 4,
Line 21, change "to derive" to -- derivation of --.
Line 54, change "to derive" to -- derivation of --.
Line 66, change "method" to -- system --.

Column 5,
Line 31, after "using" insert -- a --.

Column 6,
Line 20, change "patent and trademark" to -- Patent and Trademark --.
Line 50, change "(orthography 2))" to -- (orthography 25) --.
Line 56, after "points" delete -- to --.
Line 65, change "anyone" to -- any one --.

Column 7,
Lines 4-5, change "to associate" to -- association of --.
Line 35, change "stations" to -- situations --.

UNITED STATES PATENT AND TRADEMARK OFFICE
CERTIFICATE OF CORRECTION

PATENT NO. : 5,987,408
DATED : November 16, 1999
INVENTOR(S) : Vishwa Gupta

It is certified that error appears in the above-identified patent and that said Letters Patent is hereby corrected as shown below:

Column 8,
Line 35, change "in" to -- is --.
Line 47, change "independent" to -- dependent --.
Line 65, change "members" to -- numbers --.

Column 10,
Line 7, change "8" to -- 15 --.

Column 12,
Line 45, change "to derive" to -- derivation of --.

Column 13,
Line 43, change "to derive" to -- derivation of --.

Column 14,
Line 22, change "automated directory assistance system" to -- method --.
Line 53, change "automated directory assistance system" to -- machine readable storage medium --.

Signed and Sealed this

Seventh Day of January, 2003

JAMES E. ROGAN
*Director of the United States Patent and Trademark Office*